(12) United States Patent
Chen et al.

(10) Patent No.: US 7,696,982 B2
(45) Date of Patent: Apr. 13, 2010

(54) WIRED MOUSE WITH MOBILE CELL UNIT

(75) Inventors: Shih-Hui Chen, Taoyuan Hsieh (TW); Chin-Tien Lin, Taoyuan Hsieh (TW)

(73) Assignee: Tennrich International Corporation, Taoyuan Hsieh (TW)

( * ) Notice: Subject to any disclaimer, the term of this patent is extended or adjusted under 35 U.S.C. 154(b) by 1026 days.

(21) Appl. No.: 11/195,705

(22) Filed: Aug. 3, 2005

(65) Prior Publication Data

US 2007/0030248 A1 Feb. 8, 2007

(51) Int. Cl.
*G09G 5/08* (2006.01)
(52) U.S. Cl. .................. 345/163; 345/156; 320/128
(58) Field of Classification Search .............. 345/163, 345/156; 320/128
See application file for complete search history.

(56) References Cited

U.S. PATENT DOCUMENTS

| | | | |
|---|---|---|---|
| 6,088,021 A * | 7/2000 | Yong | 345/163 |
| 6,380,714 B1 * | 4/2002 | Chou | 320/114 |
| 6,750,851 B2 * | 6/2004 | Yang | 345/169 |
| 7,110,018 B2 * | 9/2006 | Sakata | 348/14.08 |
| 7,159,700 B2 * | 1/2007 | Liao | 191/12.4 |
| 7,397,462 B2 * | 7/2008 | Wu | 345/163 |
| 2003/0036353 A1 * | 2/2003 | Yang | 455/41 |
| 2003/0098850 A1 * | 5/2003 | Jzuhsiang | 345/163 |
| 2003/0201951 A1 * | 10/2003 | Chin | 345/63 |
| 2005/0174091 A1 * | 8/2005 | Dayan et al. | 320/128 |
| 2006/0007147 A1 * | 1/2006 | Lee | 345/163 |
| 2006/0007151 A1 * | 1/2006 | Ram | 345/163 |
| 2006/0176277 A1 * | 8/2006 | Daniel et al. | 345/163 |
| 2006/0232555 A1 * | 10/2006 | Wu | 345/163 |
| 2007/0002020 A1 * | 1/2007 | Ranta et al. | 345/166 |

* cited by examiner

*Primary Examiner*—Bipin Shalwala
*Assistant Examiner*—Afroza Y Chowdhury
(74) *Attorney, Agent, or Firm*—Jackson IPG PLLC

(57) ABSTRACT

A wired mouse containing a circuit board, a connection line to connect the mouse to a PC, and a built-in mobile power module; the mobile power module being charged by the PC external source, or a second connection interface being provided to the mouse, the power source module charging any other electronic product through the second connection interface while the mouse is operating.

5 Claims, 9 Drawing Sheets ary of the Invention

WIRED MOUSE WITH MOBILE CELL UNIT

BACKGROUND OF THE INVENTION (a) Field of the Invention

The present invention is related to a wired mouse provided with a built-in power source module for the mouse to charge and discharge at the same time.

(b) Description of the Prior Art

PC has become a part of one's daily life thanks to prosperous development of information technology by day. Computer software generally available in the market has been mostly put in window for direct selection by clicking the mouse on the monitor of the PC for the item or command to be executed. A computer mouse is now practically a must of one of the peripherals to a computer.

Usually the mouse includes a body comprised of an upper case and a lower case. A left key and a right key are provided on the top end of the upper case to click an option. A trackball disposed at the bottom of the lower case is partially exposed to contact a desktop and the trackball rolls as the mouse moves relatively against the desktop. The rolling movement is converted into electric signals through a built-in circuit in the mouse, and those signals are transmitted together with the command signals generated when the user presses the left or the right key through a cable of the mouse to the PC to achieve selection of option by clicking the mouse.

A wireless mouse transmitting radio signals to a receiver connected to a computer host without connection of a cable as illustrated in FIG. 9 includes a charging box 50 and a power transmission cable 60. The charging box 50 includes a cell tray 51, a control circuit board (not illustrated), and two DC sockets 52. The cell tray accommodates one or multiple rechargeable cell, which can be conducted for charging purpose. The power transmission cable 60 includes a Y-shaped cable 61 and a 2-plug cable 62. Both ends of cables 61, 62 are respectively disposed with a plug 63.

Upon charging the wireless mouse, the rechargeable cell 53 is pulled out and placed in the tray 51 of the charging box 50; and the plug 63 disposed to one end of the Y-shaped cable 61 is inserted into the DC socket 52 of the charging box 50 while another plug 63 disposed to the other end of the Y-shaped cable 61 is connected to the receiver 70 of the wireless mouse and another plug 63 yet of the Y-shape cable 61 is inserted into a notebook 30. Accordingly, the notebook 50 is connected to the receiver 70 of the wireless mouse and the charging box 50 for the charging box 50 to charge the wireless mouse using the power supplied from the notebook 30. Furthermore, both plugs 63 respectively attached to both ends of the cable are inserted into the DC charging socket 52 of the charging box 50 and the wireless mouse to conduct through the wireless mouse and the charging box for the user to operate his notebook 30 while charging the wireless mouse. However, the additional charging box for the installation of the rechargeable cell and the electric connection comprised of additional power transmission cables of the prior art involve more complicate installation, higher production cost, and a mess of cables.

SUMMARY OF THE INVENTION

The primary purpose of the present invention is to provide a wired mouse provided with a mobile cell unit that is essentially comprised of having a circuit board built in the mouse, a cable disposed at where appropriately to connect the mouse to a computer, and a built-in mobile power source module. Accordingly, when the mouse is in use, the external source to the computer charges the power source module for the power source module to maintain a certain level of power at any time.

Furthermore, a second connection interface is disposed to the mouse to charge any other product that needs to be charged through the second connection interface while the mouse is in operation.

DETAILED DESCRIPTION OF THE PREFERRED EMBODIMENTS

Figure 1:
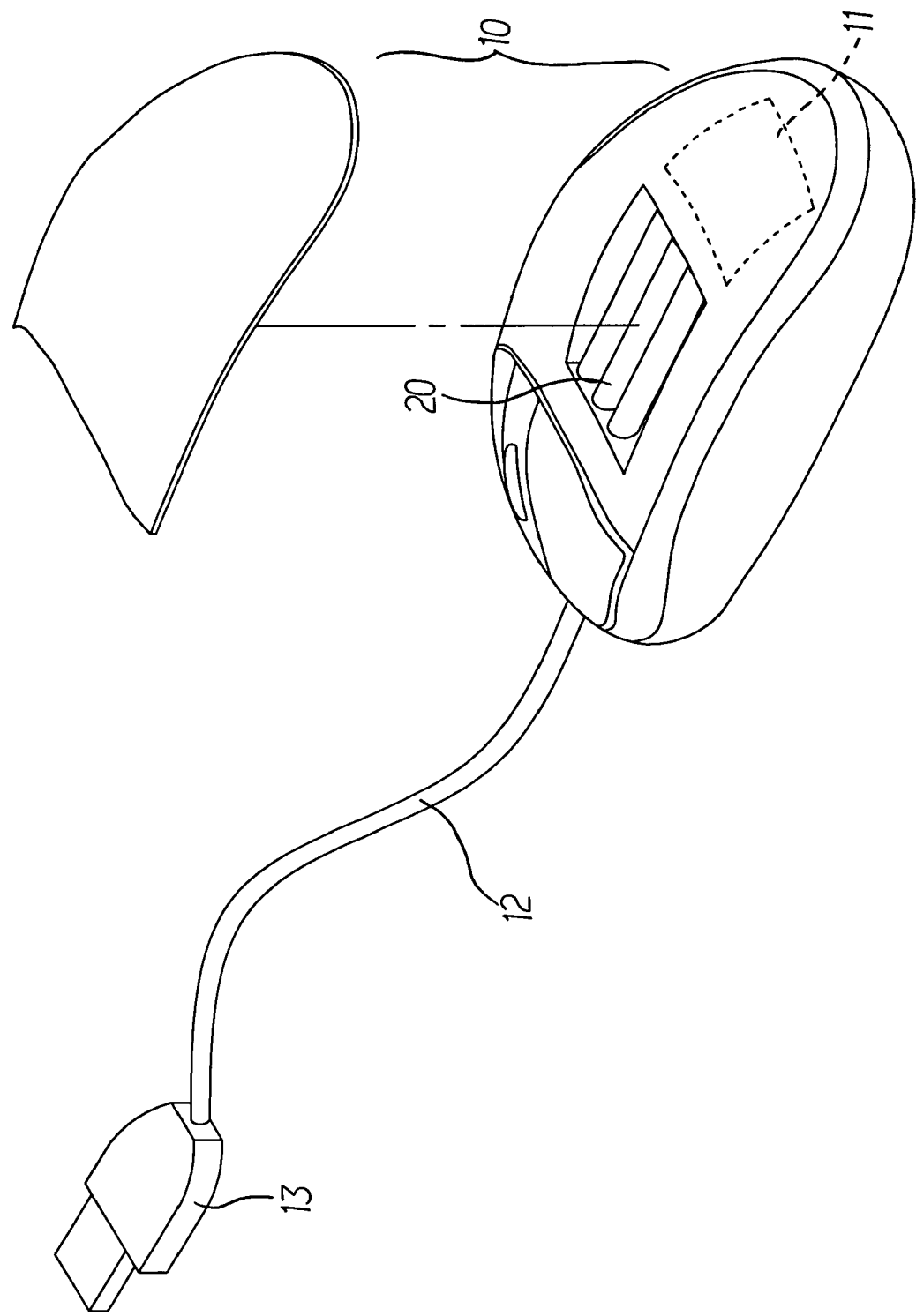
FIG. 1 is a perspective view of a first preferred embodiment of the present invention.
Figure 2:
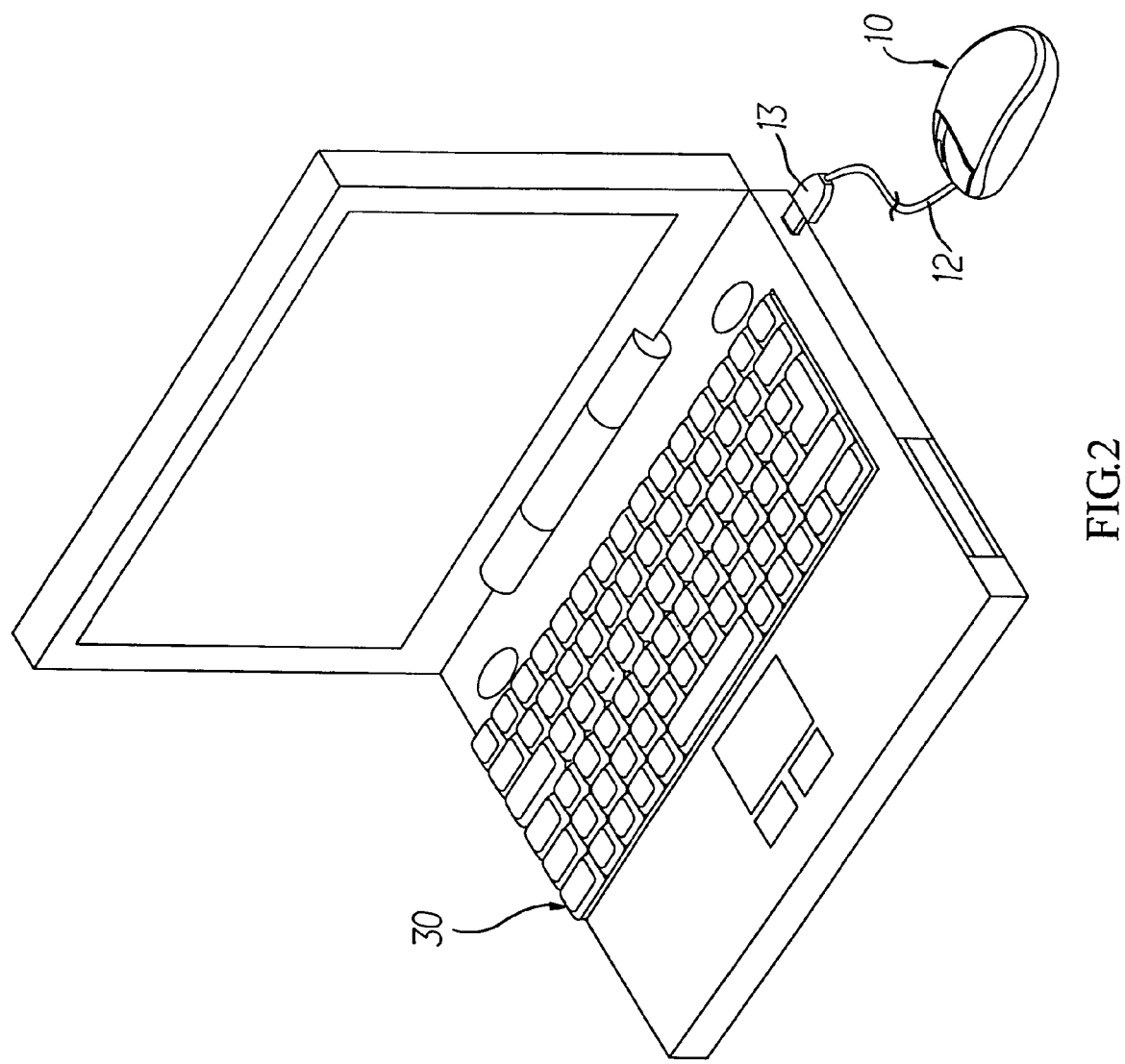
FIG. 2 is a schematic view showing an operation status of a wired cable of the first preferred embodiment of the present invention.

Referring to FIGS. 1 and 2, a wired mouse 10 with a mobile cell unit of the present invention contains a circuit board 11 for the circuit control, and a cable 12 is attached to the front end of the mouse 10 to connect the mouse 10 to a computer 30 for operating the mouse 10.

Figure 3:
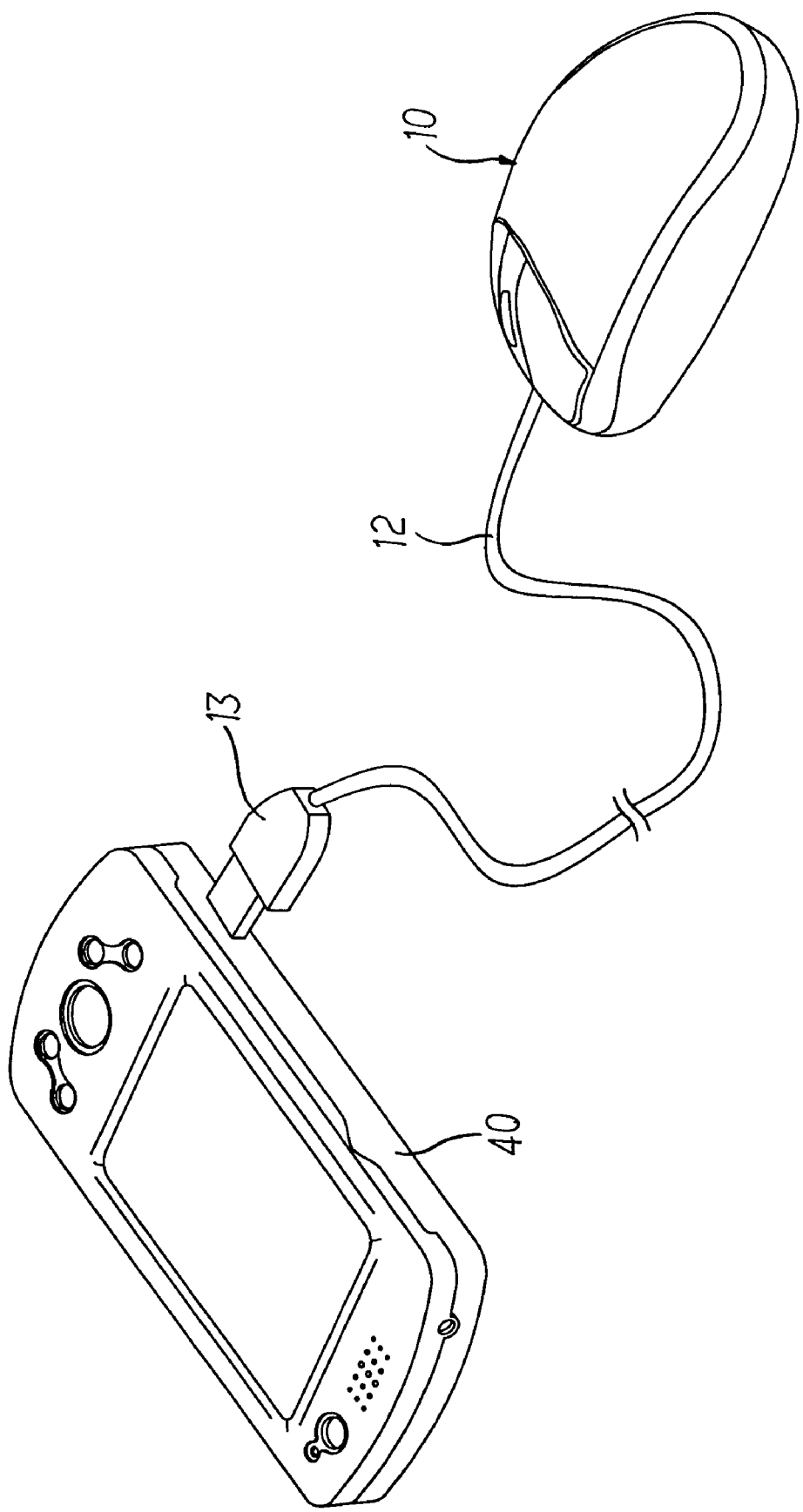
FIG. 3 is a schematic view showing another operation status of a wired cable of the first preferred embodiment of the present invention.

The present invention is characterized by having a power source module 20 built in the mouse 10. The power source module 20 by using an external power functions as a charging source or supplies a discharging source to any electronic product needed to be charged. Accordingly, when the mouse 10 is connected to a computer, a notebook 30 in the preferred embodiment, through the cable 12 and a connection interface 13, and the power source to the notebook 30 charges the power source module 20 built in the mouse 10 for the power source module 20 to maintain a certain level of power at any time. The power source module 20 therefore constitutes a transfer type of power source module to charge any other electronic product 40 (a cellular phone or a PDA) through the connection interface 13; wherein the connection interface 13 may be related to IEEE1394 or universal series port. In the preferred embodiment, a USB connection port is used as illustrated in FIG. 3.

Figure 4:
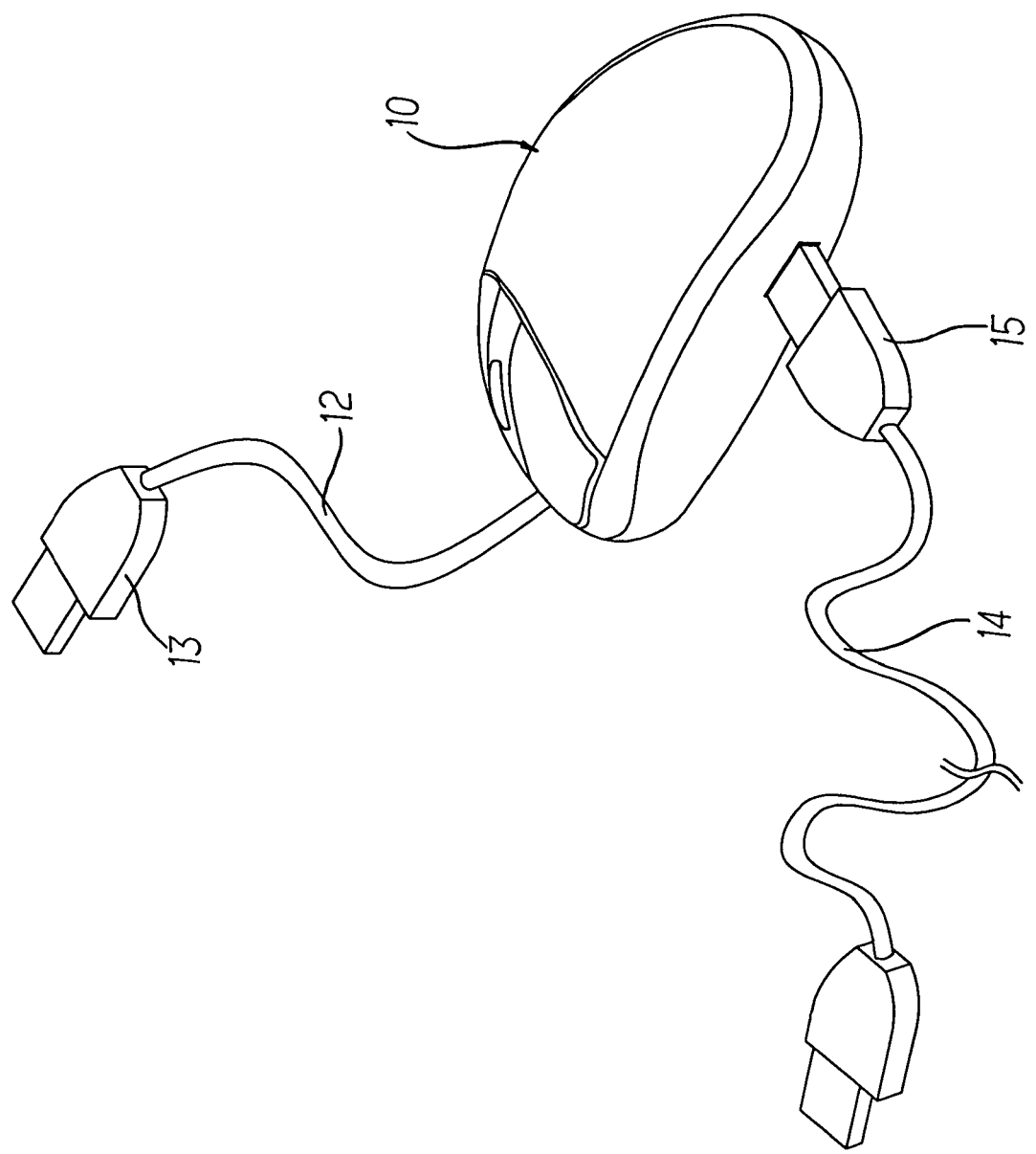
FIG. 4 is a schematic view showing an appearance of a second preferred embodiment of the present invention.
Figure 5:
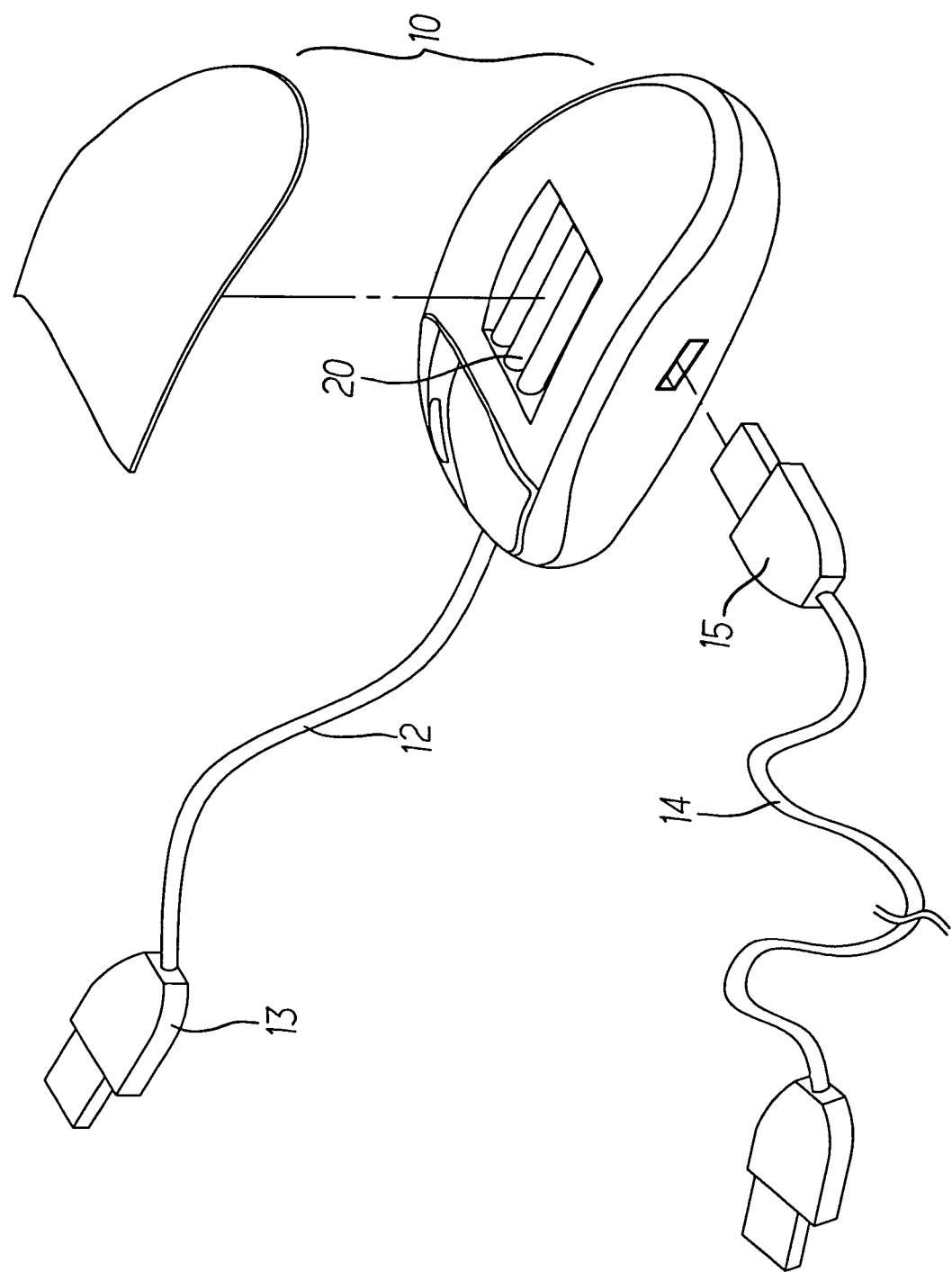
FIG. 5 is a perspective view of the second preferred embodiment of the present invention.
Figure 6:
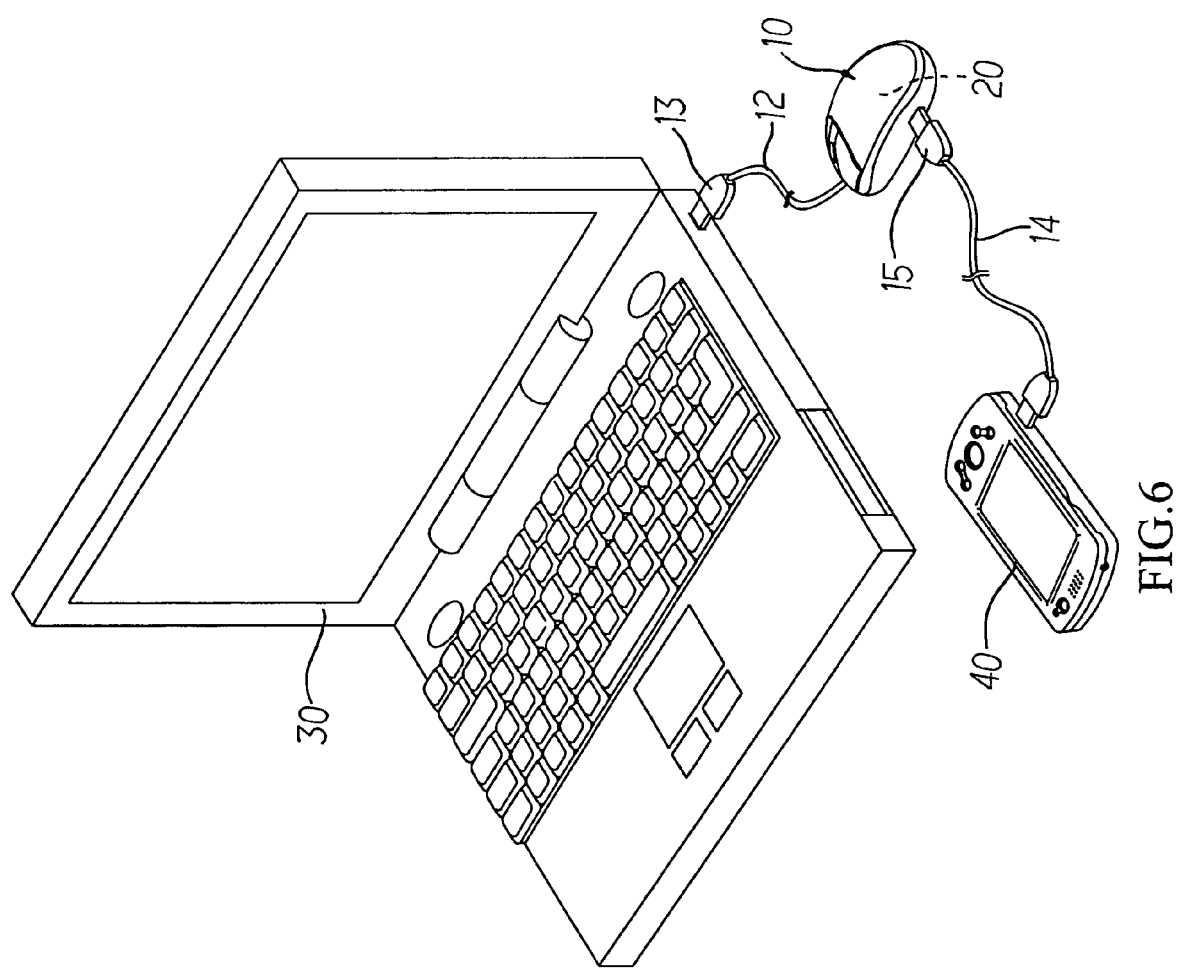
FIG. 6 is a schematic view showing an operation status of a wired cable of the second preferred embodiment of the present invention.

Now referring to FIGS. 4 and 5 for a second preferred embodiment of the present invention, the mouse 10 is provided with the same power source module 20 and a second connection interface 15 is provided at where appropriately to the mouse 10. Similarly, a connection port is each disposed at the front and the rear of the cable of a second cable 14 for the transmission in conjunction with the second connection interface 15. As illustrated in FIG. 6, when the mouse 10 is connected to a notebook by means of the cable 12 and the connection interface 13, the power source module 20 built in the mouse 10 charges another electronic product 40 (e.g., a cellular phone or a PDA) through the second cable 14 and the second connection interface 15.

Of course, the second connection interface 15 may be provided at where appropriately on the mouse 10 (in this preferred embodiment, a USB connection port is disposed on one side of the mouse 10); and one or multiple second connection interface 15 may be provided.

Figure 7:
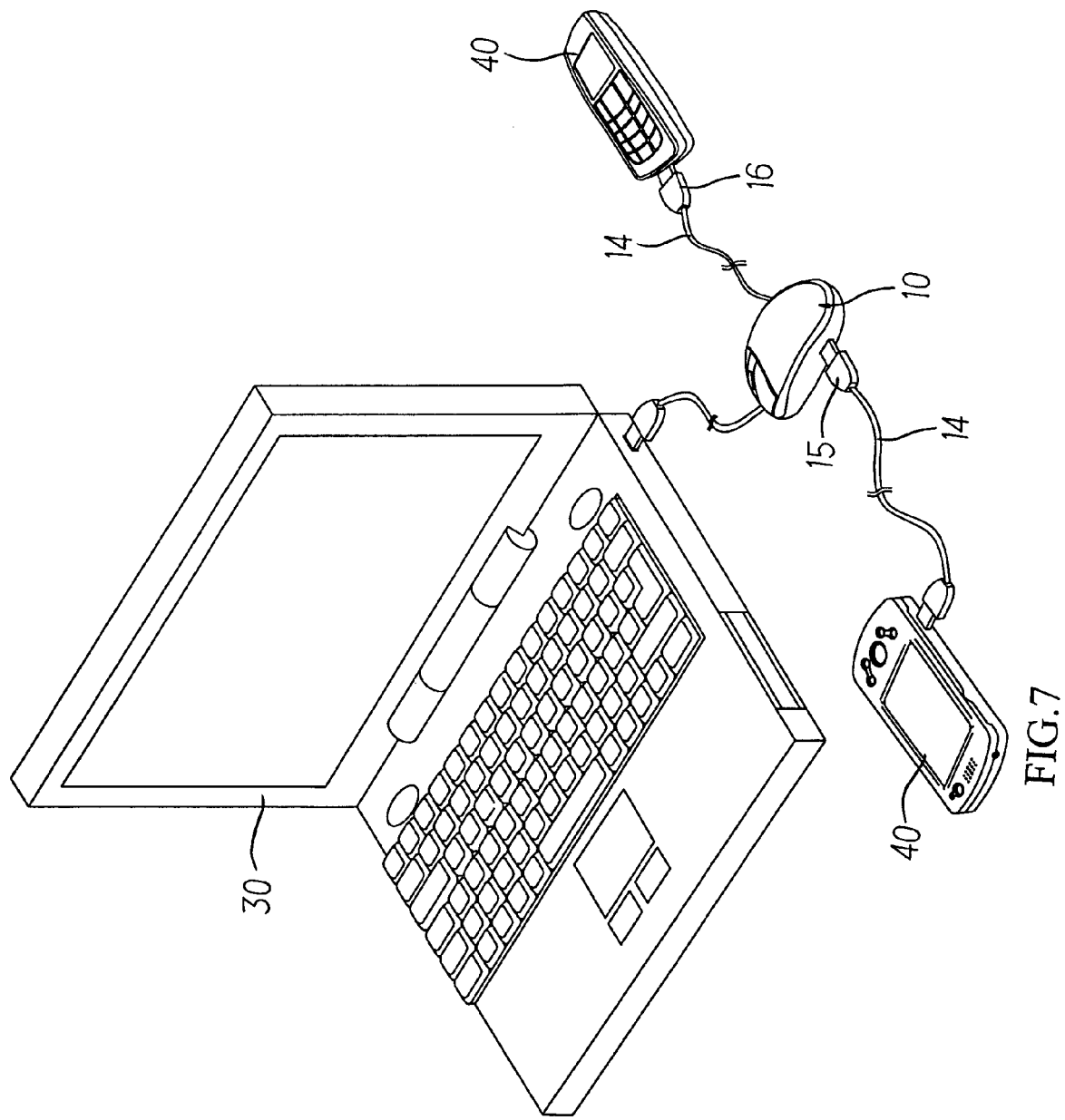
FIG. 7 is a schematic view showing another operation status of a wired cable of the second preferred embodiment of the present invention.
Figure 8:
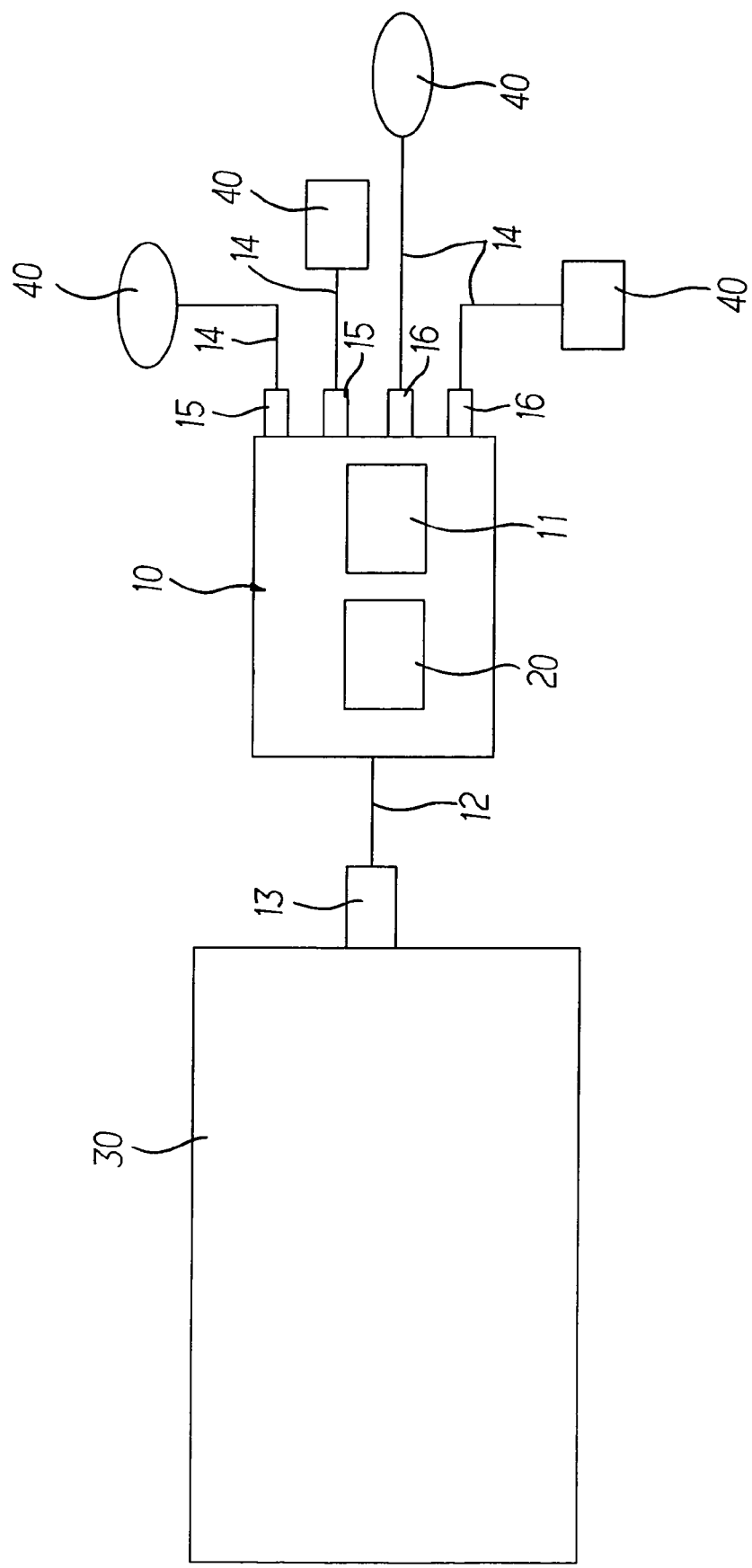
FIG. 8 is a block chart of the operation of the wired mouse of the second preferred embodiment of the present invention.
Figure 9:
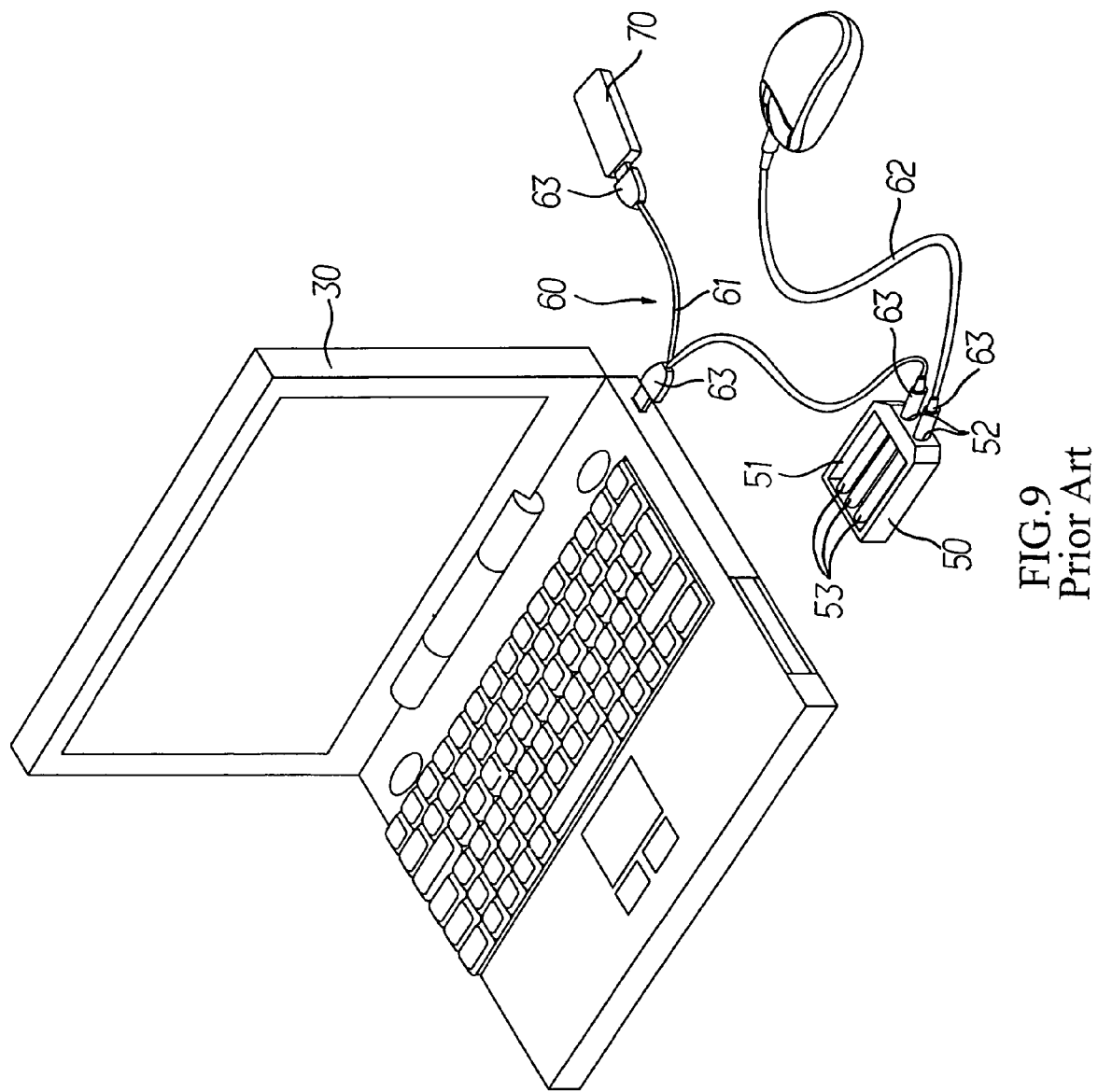
FIG. 9 is schematic view showing an appearance of a wireless mouse of the prior art.

The second cable 14 may be directly provided to the mouse 10 and a third connection interface 16 may be provided to the other end of the second cable 14 to charge another electronic product 40 at the same time as illustrated in FIG. 7. The mouse 10 and the power source module 20 may supply their power to multiple electronic products 40 through the second cable 14, the second connection interface 15, and the third connection interface 16.

The prevent invention provides an improved structure of wired mouse containing a mobile power source module for the mouse to charge and discharge at the same time while it is in use; and the application for a utility patent is duly filed accordingly. However, it is to be noted that that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A wired mouse with a mobile cell unit comprising: a mouse, a circuit board built in the mouse, a cable disposed to the mouse at where appropriately, and a power source module disposed in the mouse; the power source circuit of the power source module being connected to the circuit board to charge or discharge; the cable being disposed to the mouse to connect it to a computer at one end and disposed with a connection interface at the other end, wherein the power source module is configured for being charged with electric power via the cable, when a computer is connected to the connection interface of the cable, and wherein the power source module is configured for charging another electronic product via the cable, when the another electronic product is connected to the connection interface of the cable while the computer is disconnected from the connection interface of the cable.

2. The wired mouse with a mobile cell unit of claim 1, wherein one or multiple second cable is disposed to the mouse, and one end of the second cable is disposed with a second connection interface.

3. A wired mouse with a mobile cell unit connected to a computer by means of a cable, wherein, the mouse containing a circuit board, a power source module, one or multiple second cable; the power source module being connected to the circuit board to charge or discharge; one end of the second cable being disposed with a second connection interface; and the power source module charging another electronic product through the connection of the second cable while the mouse is connected to the computer.

4. The wired mouse with a mobile cell unit of claim 1, wherein the connection interface relates to IEEE1394 or universal series port.

5. The wired mouse with a mobile cell unit of claim 3, wherein the connection interface relates to IEEE1394 or universal series port.

* * * * *